US012592568B2

(12) United States Patent
Arbel

(10) Patent No.: US 12,592,568 B2
(45) Date of Patent: Mar. 31, 2026

(54) ROAD-BASED SOLAR SYSTEM FOR PRODUCTION OF HYDROGEN AND ELECTRICITY

(71) Applicant: Avraham Arbel, Ramat HaSharon (IL)

(72) Inventor: Avraham Arbel, Ramat HaSharon (IL)

( * ) Notice: Subject to any disclaimer, the term of this patent is extended or adjusted under 35 U.S.C. 154(b) by 0 days.

(21) Appl. No.: 18/658,539

(22) Filed: May 8, 2024

(65) Prior Publication Data

US 2024/0291279 A1 Aug. 29, 2024

Related U.S. Application Data

(63) Continuation of application No. PCT/IL2022/051187, filed on Nov. 9, 2022.

(Continued)

(51) Int. Cl.
*H02J 3/38* (2006.01)
*H01M 8/0662* (2016.01)
(Continued)

(52) U.S. Cl.
CPC ............. *H02J 3/38* (2013.01); *H01M 8/0681* (2013.01); *H01M 10/465* (2013.01);
(Continued)

(58) Field of Classification Search
CPC ...... H02J 3/38; H02J 2300/24; H02J 2300/30; H02J 2300/40; H01M 8/0681;
(Continued)

(56) References Cited

U.S. PATENT DOCUMENTS 7,674,358 B2 3/2010 Gibson et al.
7,800,036 B2 9/2010 Fein et al.
(Continued)

FOREIGN PATENT DOCUMENTS

CN 201518457 U 6/2010
DE 102016011224 A1 3/2017
(Continued)

OTHER PUBLICATIONS

PCT International Search Report for International Application No. PCT/IL2022/051187, mailed Jan. 30, 2023, 6pp.
(Continued)

*Primary Examiner* — Daniel Cavallari
(74) *Attorney, Agent, or Firm* — The Roy Gross Law Firm, LLC; Roy D. Gross

(57) ABSTRACT

The invention is directed to a system and method for for producing energy on transportation routes. A road-based Solar System for production of hydrogen and electricity is provided. This is a novel decentralized system for production, storage, energy collection, conversion is disclosed comprising:

a. System and method for converting solar energy to electrical energy;

b. Means and methods for storing and/or transporting said electrical energy;

c. System and for converting said electrical energy to a gas fuel;

d. System and method for storing or transporting said gas fuel;

The modules and units for converting solar energy to electrical energy are configured to be positioned above, adjacent on or a transportation network, thereby utilising the pre-existing road system and drastically reducing wasteful land use.

17 Claims, 3 Drawing Sheets

Related U.S. Application Data

(60) Provisional application No. 63/277,175, filed on Nov. 9, 2021.

(51) Int. Cl.

| | |
|---|---|
| *H01M 10/46* | (2006.01) |
| *H01M 16/00* | (2006.01) |
| *H02S 10/10* | (2014.01) |
| *H02J 101/24* | (2026.01) |
| *H02J 101/30* | (2026.01) |
| *H02J 101/40* | (2026.01) |

(52) U.S. Cl.
CPC ........... *H01M 16/006* (2013.01); *H02S 10/10* (2014.12); *H01M 2220/10* (2013.01); *H01M 2250/10* (2013.01); *H02J 2101/24* (2026.01); *H02J 2101/30* (2026.01); *H02J 2101/40* (2026.01)

(58) Field of Classification Search
CPC ............. H01M 10/465; H01M 16/006; H01M 2220/10; H01M 2250/10; H01M 8/0656; H02S 10/10; H02S 10/20; H02S 20/21; C25B 15/081; C25B 15/00; C25B 1/04; B60L 53/51; B60L 53/53; B60L 53/54; Y02E 10/50; Y02E 60/30

See application file for complete search history.

(56) References Cited

U.S. PATENT DOCUMENTS

| | | | |
|---|---|---|---|
| 10,535,904 | B2 | 1/2020 | Retti |
| 11,236,864 | B1 | 2/2022 | Ewan et al. |

| | | | | |
|---|---|---|---|---|
| 2004/0013923 | A1 | 1/2004 | Molter et al. | |
| 2007/0138006 | A1 | 6/2007 | Oakes et al. | |
| 2008/0149403 | A1 | 6/2008 | Fein et al. | |
| 2010/0252088 | A1 | 10/2010 | Fein et al. | |
| 2011/0113705 | A1 | 5/2011 | Raczkowski | |
| 2012/0181973 | A1 | 7/2012 | Lyden | |
| 2018/0097136 | A1 | 4/2018 | Retti | |
| 2021/0126574 | A1* | 4/2021 | Duggal | E01C 1/00 |
| 2021/0261010 | A1* | 8/2021 | Pickles | B60L 50/75 |
| 2022/0220621 | A1* | 7/2022 | Morrison | C25B 15/00 |
| 2024/0141507 | A1* | 5/2024 | Smith | C25B 1/55 |
| 2024/0305235 | A1* | 9/2024 | Singh | H01M 8/0656 |
| 2024/0396479 | A1* | 11/2024 | Fleischer | H02P 9/02 |
| 2025/0309300 | A1* | 10/2025 | Gregoire-Mazzocco | H01M 16/003 |

FOREIGN PATENT DOCUMENTS

| | | | |
|---|---|---|---|
| DE | 102015118207 | A1 | 4/2017 |
| DE | 102018007001 | A1 | 3/2020 |
| WO | 2017128847 | A1 | 8/2017 |

OTHER PUBLICATIONS

PCT Written Opinion for International Application No. PCT/IL2022/051187, mailed Jan. 30, 2023, 6pp.

PCT International Preliminary Report on Patentability for International Application No. PCT/IL2022/051187, issued May 2, 2024, 7pp.

European Patent Office, European Search Opinion in parallel Application No. 22892272, issued Oct. 27, 2025, 9pp.

\* cited by examiner

ROAD-BASED SOLAR SYSTEM FOR PRODUCTION OF HYDROGEN AND ELECTRICITY

CROSS REFERENCE TO RELATED APPLICATIONS

This application is a National Phase of PCT Patent Application No. PCT/IL2022/051187 having International filing date of Nov. 9, 2022, which claims the benefit of priority of U.S. Provisional Patent Application No. 63/277, 175, filed Nov. 9, 2021, the contents of which are all incorporated herein by reference in their entirety.

BACKGROUND

Solar-based power generation systems are incapable of generating power throughout the day, producing at a high level of power during the daylight hours. Therefore, there is a need to store or disperse the energy produced. The excess power can be stored as electricity or converted to another form, such as hydrogen. Hydrogen producing technologies, such as electrolyzes can be used to generate hydrogen in fueling stations.

The developed world's consumption of energy, mainly in the form of electricity, is constantly increasing. In addition, there is a need to limit the use of fossil fuels, as a way to deal with rising atmospheric carbon. The growing demand for electricity will place a considerable strain on power grid.

Current power demand comprises 21% electrical power and 79% as fuel (such as natural gas, diesel etc.). As demand for electrical power rises, with the transfer of more segments of the economy (such as transportation) to work on electrical power, demand will continue to rise. This will also necessitate that the power grid provides growing amounts of electrical power throughout the day, and at every season.

U.S. Pat. No. 7,800,036 disclosed a roadway system for energy generation and distribution is presented. In accordance with one embodiment of the invention, the roadway system comprises a plurality of solar energy generating devices, and a roadway system electricity grid. The Solar energy generating devices are electrically connected to the roadway system electricity grid and are positioned on part of or near to a road in a system of roads and being optionally fixed in a position Such that a multi-form, Solar energy gathering network can be formed.

US application US20100252088 discloses a vehicle for gathering solar energy into a roadway system electricity grid. In one embodiment of the invention, the vehicle comprises an energy storage system; and at least one solar energy generating device coupled to the vehicle. The at least one solar energy generating device is configured to generate electricity from sunlight. The at least one solar energy generating device is configured to electrically connect to a roadway system electricity grid. In another embodiment of the present invention is a method for a vehicle gathering solar energy and providing the same to the roadway system electricity grid. The method comprises the step of harnessing solar energy from a vehicle-based solar energy gathering device; converting solar energy into electrical energy; storing the electrical energy; and discharging the stored electrical energy to a roadway system electricity grid.

US application US2007/0138006 disclosed a hydrogen gas generation system is provided for use in a mobile vehicle. The mobile vehicle may be for example, a car or truck or other vehicle such as a balloon, dirigible, airship, ship, or boat. The vehicle has an on-board hydrogen generator for generating hydrogen gas, preferably using an electrolysis process. The hydrogen produced by the electrolysis process is stored in an on-board hydrogen storage tank. Hydrogen from the storage tank is flowed into a vehicle propulsion system where the hydrogen gas is consumed to provide power to propel the vehicle. An on-board electrical generation system provides at least Some of the electricity for the electrolysis process. In one example, the vehicle has an on-board electrical generator for providing electricity for the electrolysis process. The on-board electric generation system may be, for example, a Solar photovoltaic cell system, a wind turbine generator system, or a regenerative braking generator, for example. Depending on the particular electrical generation process or processes used, the vehicle may generate hydrogen gas when moving, when coasting or braking, or when long-term parked.

U.S. Pat. No. 7,674,358 discloses a method for configuring a solar hydrogen generation system and the system optimization are disclosed. The system utilizes photovoltaic modules and an electrolyte solution to efficiently split water into hydrogen and oxygen. The efficiency of solar powered electrolysis of water is optimized by matching the most efficient voltage generated by photovoltaic cells to the most efficient input voltage required by the electrolysis cell(s). Optimizing PV-electrolysis systems makes solar powered hydrogen generation cheaper and more practical for use as an environmentally clean alternative fuel.

US application US2018/0097136 discloses a multiple layer composition and method for deposition of a solar energy harvesting strip onto a driving surface that will allow electric cars to charge by an inductive coupling. The multiple layer composition includes at least one magnetic material for generating a magnetic field, wherein at least one of the multiple layers comprises the magnetic material. Further, the a multiple layer composition includes at least one solar energy harvesting material for converting at least one of thermal and photonic energy into electrical energy, wherein at least one of the multiple layers comprises the at least one solar energy harvesting material and wherein the at least one solar energy harvesting material is located within a magnetic field generated by the at least one magnetic material. An alternative multiple layer composition includes a thermal energy harvesting material for converting thermal energy into electrical energy, wherein at least one layer comprises the thermal energy harvesting material, and a photonic energy harvesting material for converting photonic energy into electrical energy, wherein at least one layer comprises the thermal energy harvesting material. Additionally provided is a solar energy harvesting buckyball, inductive coupling device, vehicle chassis for storing electrical energy, atmospheric intake hydrogen motor, electrical energy generating tire and mechanical energy harvesting device U.S. Pat. No. 10,535,904 discloses an autonomous, modular energy generation, storage and transmission apparatus, system, and method is provided. An apparatus is tube shaped and includes solar and thermionic energy conversion layers, and a battery module. A system of modular apparatuses may be connected together to form a transmission network. Such devices are particularly suited for outdoor application on highway jersey walls, and for indoor application on office cubicle walls. A method of charging battery modules in the apparatus is provided, along with a method of distributing the same in commerce.

Chinese patent CN201518457 discloses a solar energy generation device erected on traffic pavement. The device comprises a frame body which spans and is erected on the traffic pavement and comprises at least two frame body units fixed and connected with each other through a connecting rod, a solar panel array which is laid on the connecting rod between the frame body units and comprises a plurality of solar panels and a photoelectric conversion mechanism used together with the solar panels. The utility model has the benefits as follows: 1, the long and wide space above the traffic pavement is fully utilized to erect the solar panels, so that the electricity generated by the solar panels can be used nearby, and the cost and the expense are greatly reduced; 2, the traffic pavement is prevented from being directly exposed to the sun, thereby reducing the phenomenon that the traffic pavement cracks due to high-temperature exposure and prolonging the service life of the traffic pavement; and 3, liquid hydrogen filling stations are developed nearby, namely, water is electrolyzed by the electricity generated by solar energy generation to generate hydrogen, and the hydrogen is liquefied and stored, thereby forming a liquid hydrogen filling network spreading all over the traffic pavement.

DE application DE102016011224 discloses a modern road construction wherein the road surface is provided with a bright transparent, preferably water-permeable layer which can be heated less by solar radiation and roll on the vehicle tires safely. The roads will have a substructure of at least one level that can be between 20 mm and 3500 mm in height and occupy different heights in a plane. They are used to hold interconnected via electrical cables and pipes functional device that are mounted as a mobile container on the surface of a plane. A disadvantage of batteries is too low storage density. The storage density from an electrolyzer stores a multiple of it. Pure hydrogen is preferably introduced into a hydrogen carrier or stored as synthetic methane.

PCT application WO2017128847 discloses a technique for high-efficient large-scale hydrogen generation through solar photocatalytic-photoelectrocatalytic decomposition of water, namely, a powder photocatalyst converts a soluble high valent state electron carrier into a low valent state under the illumination of the sun so as to achieve the large-area storage of sun energy, and at the same time, release oxygen gas and produce protons, and an electrolyte solution storing the electron carrier and the protons is transported to a photoelectrocatalysis tank. At the anode of the photoelectrocatalysis tank, a photogenic charge carrier is produced using sunlight and is used to oxidise the low valent state electron carrier into a high valent state, and at the cathode, the protons are combined to produce hydrogen gas. After collecting hydrogen gas, the electrolyte solution is returned to the photocatalysis system for recycling. The whole reaction is driven by sunlight and realizes the conversion of solar energy to hydrogen energy.

US application US 2021/0261010 discloses a supply station and a method capable of charging electricity and filling with hydrogen gas simultaneously or separately, the supply station comprising: a power supply unit, a storage battery system, a device capable of converting electric power into hydrogen gas, a hydrogen gas storage system, a device capable of converting hydrogen gas into electric power, a charger and a hydrogen dispenser; the power supply unit is connected with the storage battery system to deliver power, the storage battery system is connected with the device capable of converting electric power into hydrogen gas so as to convert the electric power provided by the storage battery system into hydrogen gas; the device capable of converting electric power into hydrogen gas is connected with the hydrogen gas storage system to store hydrogen gas in the hydrogen gas storage system; the hydrogen gas storage system is connected with the device capable of converting hydrogen into electric power. Compared with the supply station and the method provided by the prior art, the supply station and the method provided by the present disclosure can perform dynamic adjustments according to the requirements of the electric vehicles and hydrogen powered vehicles, and reduce device investment and relieve the limitation of the electricity storage amount of the storage battery system and the hydrogen storage amount of the hydrogen gas storage system.

U.S. Pat. No. 11,236,864 discloses a system, method and apparatus to transport and distribute hydrogen, store energy at scale, and interconnect locations where large quantities of "green" hydrogen can be produced most advantageously, with cities, towns and rural communities where hydrogen is needed as a clean transportation fuel, industrial feedstock, power source, and for long-term storage of electrical power. A hydrogen distribution pipeline enables use of natural gas, oil and other existing pipelines to transport hydrogen to one or more distribution points; and in one embodiment, integrates a lighter-than-air airship to transport hydrogen between locations where pipelines don't exist or are impractical. widespread use of hydrogen in helping address climate change.

"Way of life" (WOL) platform is a multi-faceted and systematic solution designated to reduce, or even prevent, greenhouse gas emissions during energy production (electricity and hydrogen), supply and consumption. The WOL platform enables the decentralized and local generation of electrical and/or hydrogen-based energy.

Historically, the wide spread use of direct current (DC) has been limited by the methods of current generation and the need for long-distance delivery (due to centralized production, regardless of the method of production). The decentralized and localized production method of the WOL platform shortens the distances need to deliver an electric current, enabling the utilization of DC.

DC enables the more efficient utilization of electrical current by most electric appliances. The WOL platform enables direct production and delivery of DC (by solar and or hydrogen technologies), enabling the development of the more efficient DC economy.

A decentralized network is more efficient for providing energy manufacture and distribution without the need for DC-to-AC/AC-to-DC conversion which results in loss or without the need for conveying the energy through the grid which results also in energy loss.

There is a well-known need for the generation of green energy for widespread use.

FIELD OF THE INVENTION

The invention relates to a system and method for a decentralized system for the production, storage, energy collection, conversion and supply system.

SUMMARY

It is the object of the present invention to present a system for producing energy on transportation routes, comprising:
   a. at least one Photovoltaic Unit PVU for converting solar energy to electrical energy;
   b. at least one Hydrogen Production Unit HPU for converting said electrical energy to hydrogen by water hydrolysis;
   c. at least one pipe for at least one of: absorbing, storing, transporting, supplying hydrogen, and any combination thereof;

d. at least one Hydrogen Conversion Unit HCU for producing electricity from said hydrogen;

e. at least one electrical grid for transmitting said electricity from PVU and produced by the HCU;

f. Electricity Storage and Transport Unit ESTU for storing said electricity from PVU and produced by the HCU;

g. at least one Electricity Conversion Unit ECU for converting DC electricity from PVU and produced by the HCU to AC electricity;

wherein the unit for converting solar energy to electrical energy and hydrogen is configured to be positioned above, adjacent on or a transportation network.

In some embodiments of the present invention system comprises at least four of the system components from the group of comprising pipe for absorbing, storing, transporting and supplying; Photovoltaic Unit for converting solar energy to electrical energy; battery unit for storing and/or transporting said electrical energy; hydrolysis for converting said electrical energy to hydrogen by water hydrolysis; At least one system of DC generator.

It is another object of the present invention to present a system as presented in any of the above, wherein the solar energy system is characterized as a Photovoltaic Unit PVU.

It is another object of the present invention to present a system as presented in any of the above, wherein the Photovoltaic Unit PVU comprises at least one photovoltaic cell PVC.

It is another object of the present invention to present a system as presented in any of the above, wherein the solar energy system comprises at least one Electricity Conversion Unit ECU.

It is another object of the present invention to present a system as presented in any of the above, wherein the unit for storing and/or transporting the electrical energy, comprises at least one system for storing the electrical energy.

It is another object of the present invention to present a system as presented in any of the above, wherein the system for storing the electrical energy is characterized as a rechargeable battery.

It is another object of the present invention to present a system as presented in any of the above, wherein the system for transporting the electrical energy is characterized as an existing electrical grid.

It is another object of the present invention to present a system as presented in any of the above, wherein the system for transporting the electrical energy is interconnected to a plurality of PVUs.

It is another object of the present invention to present a system as presented in any of the above, wherein the unit for storing and/or transporting comprises at least one unit for converting Direct current DC to Alternating current AC and/or to Alternating current AC to Direct current DC.

It is another object of the present invention to present a system as presented in any of the above, wherein the unit for storing and/or transporting is configured for conveying direct current DC and alternating current AC.

It is another object of the present invention to present a system as presented in any of the above, wherein the gas fuel is hydrogen.

It is another object of the present invention to present a system as presented in any of the above, wherein the unit for storing and or transporting the gas fuel is configured to store and transport the gas fuel.

It is another object of the present invention to present a system as presented in any of the above, wherein the unit for storing the gas fuel is characterized as a pipe, a tank, as being interconnected to a plurality of HPUs or as being open-ended.

It is another object of the present invention to present a system as presented in any of the above, wherein the unit for storing the gas fuel is chemical storage.

It is another object of the present invention to present a system as presented in any of the above, wherein the chemical storage is characterized as converting the hydrogen to a different gas fuel.

It is another object of the present invention to present a system as presented in any of the above, wherein the gas fuel is selected from a group consisting of ammonia and methane.

It is another object of the present invention to present a system as presented in any of the above, wherein the pipe is positioned below or adjacent to the transportation network.

It is another object of the present invention to present a system as presented in any of the above, wherein the storage unit is characterized as storing the hydrogen at a pressure of relative low pressure.

A method for producing energy on transportation routes, comprising steps of:

a. Obtaining the system of according to any of the above;

b. Positioning the Photovoltaic Unit PVU on or adjacent to a transportation route;

c. Generating electrical current from at least one PVU;

d. Transferring the electrical current to a at least one hydrogen production unit HPU or at least one Electricity Storage and Transport Unit ESTU;

e. Generation of hydrogen by the HPU; and f. Transferring and/or storing the hydrogen by at least one Hydrogen Storage and/or Transporting Unit HSTU;

wherein the step of transferring the hydrogen comprises a step of feeding the hydrogen to a pipe, the pipe interconnected to a plurality of HPU.

It is another object of the present invention to present a method as presented in any of the above, additionally comprising a step of converting the electrical current from DC to AC.

It is another object of the present invention to present a method as presented in any of the above, additionally comprising a step of generating an electrical current from hydrogen.

It is the object of the present invention to present a system for hydrogen and/or AC electrical power 10, comprising:

a. At least one PVC, positioned above the center of the road system 13', adjacent to the road network 13". or configured to be positioned on the road 11;

b. At least one convertor, configured to convert DC to AC;

c. An electric grid 14 configured to transfer the electrical current generated by the PVC to an additional position for use by consumers or storage by an ESTU;

d. At least one hydrogen production unit HPU 15;

e. A pipe 16, positioned to deliver water to the HPU 15; and f. At least one pipe 17 positioned along the road network, configured to transfer and/or store the hydrogen.

It is another object of the present invention to present a system as presented in any of the above: additionally comprising at least one fuel cell 15', configured to generate electricity from hydrogen.

It is the object of the present invention to present a method for producing hydrogen and/or AC electrical power on transportation routes, comprising steps of:

a. Obtaining the system according to any of the above;

b. Positioning the Photovoltaic Unit PVU on or adjacent to a transportation route;

c. Generating DC electrical current from at least one PVU;

d. Transferring the electrical current to at least one hydrogen production unit HPU or at least one Electricity Storage and Transport Unit ESTU;

e. Converting the electrical current from DC to AC.

f. Generation of hydrogen by the HPU; and g. Transferring and/or storing the hydrogen by at least one Hydrogen Storage and/or Transporting Unit HSTU; wherein the step of transferring the hydrogen comprises a step of feeding the hydrogen to a pipe, the pipe interconnected to a plurality of HPU.

It is another object of the present invention to present a method, as presented in any of the above, additionally comprising a step of generating an electrical current from the hydrogen by at least one fuel cell.

It is the object of the present invention to present a system for generating AC electrical power from solar energy 20, comprising:

a. At least one PVC, configured to be positioned above a road system 23', adjacent to the road network 23", or on the road 21;

b. At least one inverter, configured for converting DC to AC; and c. The existing electric grid 24, configured to be utilized to transfer the electrical current generated by the PVC.

A method for producing AC current on transportation routes, comprising steps of:

a. Obtaining the system according to any of the above;

b. Positioning at least one the PVC above a road system 23', adjacent to the road network 23", or on the road 21;

c. Generating DC electrical current by the PVC;

d. Converting the DC to AC; and e. transferring the electrical current generated by the PVC, by an electric grid 24.

a. It is the object of the present invention to present a system for generating hydrogen and/or DC electrical power from solar energy 30, comprising:

b. At least one PVC configured to be positioned above a road system 33', adjacent to the road network 33", or on the road 31;

c. An DC electric grid 34, positioned adjacent to the road;

d. At least one hydrogen production unit HPU 35;

e. A pipe 36, positioned to deliver water to the HPU 35;

f. At least one pipe 37 positioned along the road network, configured to transfer and/or store the hydrogen.

It is another object of the present invention to present a system, as presented in any of the above, additionally comprising at least one fuel cell 35', configured to generate electricity from hydrogen.

It is the object of the present invention to present a method for producing energy on transportation routes, comprising steps of:

a. Obtaining the system according to any of the above;

b. Positioning the Photovoltaic Unit PVU on, above or adjacent to a transportation route;

c. Generating electrical current from at least one PVU;

d. Transferring the electrical current to at least one hydrogen production unit HPU or at least one Electricity Storage and Transport Unit ESTU;

e. Generation of hydrogen by the HPU;

f. Converting the DC to AC; and g. Transferring and/or storing the hydrogen by at least one Hydrogen Storage and/or Transporting Unit HSTU;

h. wherein the step of transferring the hydrogen comprises a step of feeding the hydrogen to a pipe, the pipe interconnected to a plurality of HPU.

It is another object of the present invention to present a method, as presented in any of the above, additionally comprising a step of generating an electrical current from the hydrogen by a fuel cell.

It is the object of the present invention to present a system for generating DC current on transportation routes 40, comprising:

a. At least one PVC, positioned above the center of the road system 43', adjacent to the road network 43". or configured to be positioned on the road 41; and b. A DC electric grid 44, configured to transfer the electrical current generated by the PVC;

A method for producing energy on transportation routes, comprising steps of:

a. Obtaining the system according to any of the above;

b. Positioning at least one the PVC above a road system 23', adjacent to the road network 23", or on the road 21;

c. Generating DC electrical current by the PVC; and d. transferring the electrical current generated by the PVC, by an electric grid 24.

BRIEF DESCRIPTION OF THE PREFERRED EMBODIMENTS

The accompanying drawings, which are included to provide a further understanding of the invention and are incorporated in and constitute a part of this specification, illustrate embodiments of the invention and together with the description and serve to explain the principles of the invention as described and disclosed herein In order to understand the invention and to see how it may be implemented in practice, a plurality of embodiments is adapted to now be described, by way of non-limiting example only, with reference to the accompanying drawings, in which.

DETAILED DESCRIPTION OF THE PREFERRED EMBODIMENT

Figure 1:
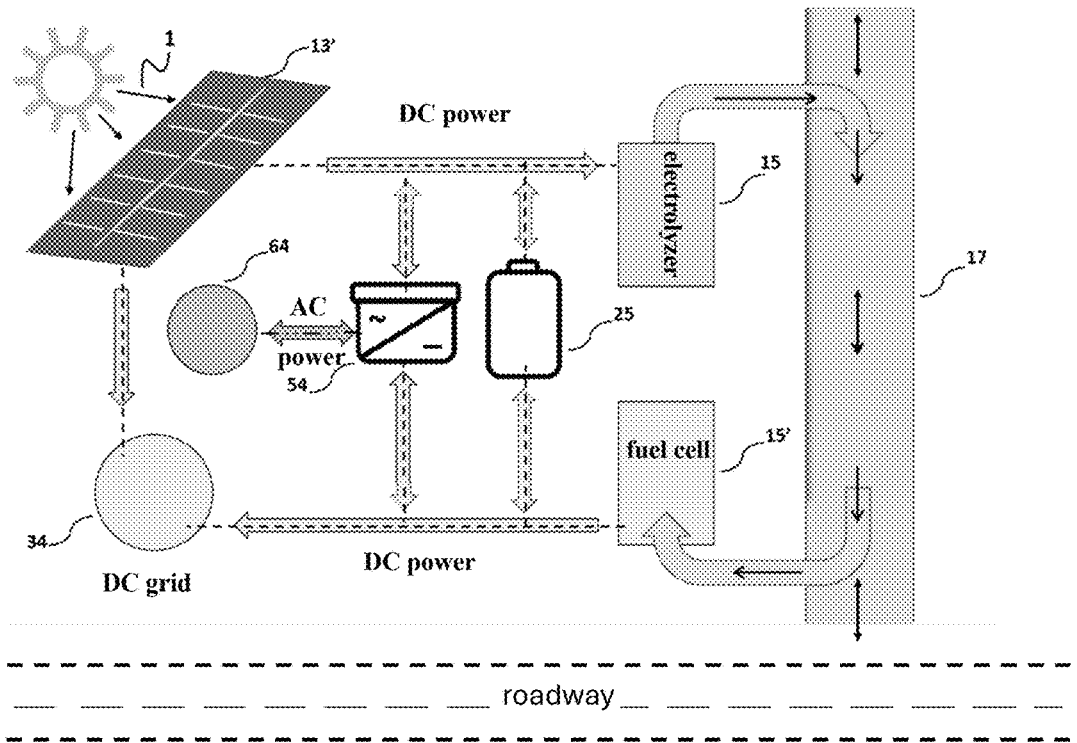
FIG. 1 illustrates schematically the WOL system for producing energy on transportation routes.

The following description is provided, alongside all chapters of the present invention, so as to enable any person skilled in the art to make use of the invention and sets forth the best modes contemplated by the inventor of carrying out this invention. Various modifications, however, are adapted to remain apparent to those skilled in the art, since the generic principles of the present invention have been defined specifically to provide compositions and methods.

Unless otherwise stated, with reference to numerical quantities, the term "about" refers to a tolerance of ±25% of the stated nominal value.

Unless otherwise stated, all numerical ranges are inclusive of the stated limits of the range.

In the present application, the term 'Power inverter' (inverter or invertor) refers to a electronic device or circuitry that changes direct current (DC) to alternating current (AC) and/or alternating current (AC) to direct current (DC).

The following abbreviations are used herein:
"PVU" stand for Photovoltaic Unit stands;
"PVP" stand for Photo-Voltaic Panel;
"PVC" stands for Photovoltaic Cell;
"ECU" stands for Electricity Conversion Unit;
"ESTU" stands for Electricity Storage and Transport Unit;
"HPU" stands for Hydrogen Production Unit;
"HSTU" stands for Hydrogen Storage and/or Transporting Unit;
"HCU" stands for Hydrogen Conversion Unit;
"DC" stands for Direct Current; and,
"AC" stands for Alternating Current.

The components used in this invention are off-the-shelf.

A person skilled in the art would appreciate that the term "Photovoltaic Unit (PVU)" refers to a component, device, or assembly configured to convert incident electromagnetic radiation, typically sunlight, into electrical energy through the photovoltaic effect. The photovoltaic unit may comprise one or more photovoltaic cells and may include associated structural, encapsulation, or interconnection elements necessary for electrical operation or integration into a larger system. Commercial photovoltaic units available today encompass primarily silicon-based (monocrystalline and polycrystalline) and thin-film technologies. Representative examples include, but are not limited to, units manufactured by LONGi, Trina, Jinko, Canadian Solar, JA Solar, Yingli, Jinko Tiger Neo, SunPower, REC Alpha, and SunPower Flex. These units may vary in form factors, efficiency, cell type, and application (rigid, flexible, bifacial, or building-integrated modules), but all serve the primary function of converting incident sunlight into electrical energy through the photovoltaic effect.

A person skilled in the art would appreciate that the term "Hydrogen Production Unit (HPU)" refers to a component, device, or system configured to convert electrical energy into chemical energy in the form of hydrogen gas through the electrolysis to split water. Commercially available HPUs include both alkaline electrolyzers and proton exchange membrane (PEM) electrolyzers, ranging from small modular units for laboratory or off-grid applications to large-scale industrial hydrogen plants. Representative examples include, but are not limited to, thyssenkrupp nucera, HydrogenPro, PEM electrolyzer, or Nel Hydrogen Electrolyse. These units may comprise one or more electrolysis cells or stacks and may include associated components such as electrodes, electrolytes, membranes, gas-liquid separators, power electronics, and control systems necessary for hydrogen generation, collection, and integration with other system components.

A person skilled in the art would appreciate that the term "Electricity Conversion Unit (ECU)" is a device or system whose function is to transform and control electrical energy, by changing its form, voltage, or frequency, to enable efficient and safe use, storage, and transmission of power in energy systems. Types of ECUs include converters, inverters, rectifiers, and transformers. There are many commercially available Electricity Conversion Units (ECUs) across various categories, including DC-AC inverters, DC-DC converters (both unidirectional and bidirectional), AC-DC power supplies, industrial converters, and hybrid inverters. Examples include the Tumo-Int 10 kVA Grid-Tie & Storage Inverter, the FLYT 10 kW Hybrid Solar/Wind Inverter, and the 36 kW On-Grid Solar Inverter (EU/US version). The selection of a specific ECU depends on several key factors, such as input and output type/voltage, power rating (kW), conversion efficiency, bidirectionality requirements, grid-tie or standalone configuration, environmental robustness, and communication or control features.

A person skilled in the art would appreciate that the term "Hydrogen Storage and/or Transporting Unit (HSTU)" refers to a device or system designed to store hydrogen safely and/or transport it from one location to another in a controlled and efficient manner. HSTUs can include high-pressure tanks, cryogenic liquid tanks, metal hydride storage systems, or chemical carriers, depending on the storage method. The selection of a specific HSTU depends on factors such as hydrogen state (gas or liquid), pressure and temperature requirements, storage capacity, safety and containment features, transport method (stationary, pipeline, or mobile), efficiency, environmental conditions, and regulatory compliance.

A person skilled in the art would appreciate that the term "Hydrogen Conversion Unit (HCU)" refers to a component, device, or system configured to convert hydrogen gas into another form of energy or chemical product through electrochemical, catalytic, or combustion processes. The hydrogen conversion unit may comprise, for example, one or more fuel cells, catalytic reactors, burners, or synthesis modules, and may include associated components for hydrogen delivery, reaction control, heat management, and electrical or thermal energy output.

A person skilled in the art would appreciate that the term "Electricity Storage and Transport Unit (ESTU)" refers to a device or system designed to store electrical energy and/or transport it from one location to another in a controlled and efficient manner. ESTUs can include batteries, supercapacitors, flywheels, and other energy storage devices, as well as equipment for transferring electricity safely such as power distribution modules and high-voltage transmission systems. The selection of a specific ESTU depends on factors such as storage capacity, voltage and current ratings, energy density, charge/discharge efficiency, power delivery requirements, bidirectionality, environmental conditions, safety and containment features, and regulatory compliance. Examples of commercially available ESTUs include lithium-ion battery packs for grid and EV applications, flow batteries for large-scale energy storage, modular supercapacitor systems for fast power delivery, and high-voltage DC transmission units for long-distance electricity transport.

FIG. 1 schematically illustrates the present invention relating to a system for producing energy on transportation routes. Solar energy reaching a photovoltaic unit PVU 13' is converted to electric energy, DC. The movement of DC within the system is represented by a dashed line ( - - - ). The electric energy can be transferred to (i) HPU 15 (ii) stored and transported using an Electricity Storage and Transport Unit ESTU 25, or (iii) ECU 54. Within the HPU 15 the electrical energy is used to split water and create hydrogen. The hydrogen produced is transferred to a pipe 17 for storing, transporting and supplying hydrogen. The movement of hydrogen within the system is represented by a line. The system further comprises a hydrogen conversion unit HCU 15' which is used to produce electricity from hydrogen when needed. The electricity produced by the PVU 13' and HCU 15' is transmitted to a DC electrical grid 34. An Electricity Conversion Unit ECU 54 is used to convert electrical DC to electrical AC. The movement of AC is represented by dashed-doted line (- • • - • • -). AC is transferred to AC electrical grid 64. A person skilled in the art would appreciate that when no solar energy is available AC from the grid can be transferred to the system.

a. at least one Photovoltaic Unit PVU for converting solar energy to electrical energy;

b. at least one Hydrogen Production Unit HPU for converting said electrical energy to hydrogen by water hydrolysis;

c. at least one pipe for at least one of: absorbing, storing, transporting, supplying hydrogen, and any combination thereof;

d. at least one Hydrogen Conversion Unit HCU for producing electricity from said hydrogen;

e. at least one electrical grid for transmitting said electricity from PVU and produced by the HCU;

f. Electricity Storage and Transport Unit ESTU for storing said electricity from PVU and produced by the HCU;

g. at least one Electricity Conversion Unit ECU for converting DC electricity from PVU and produced by the HCU to AC electricity;

wherein the unit for converting solar energy to electrical energy and hydrogen is configured to be positioned above, adjacent on or a transportation network.

The present invention relates to a system comprising:

a. At least one Photovoltaic Unit PVU (or a solar power Unit), configured for converting solar energy to electricity. The electricity can be supply as Alternating Current (AC) or Direct Current (DC). The PVU comprises:

At least one Photo-Voltaic Panel PVP (also referred to as a solar cell panel, a solar electric panel or solar panel), comprising at least one photovoltaic cell PVC (also referred to as a solar cell).

In some embodiments, the PVU has an Electricity Conversion Unit ECU, configured for converting the electricity between DC and AC, according to the desired use or mode of transportation.

The PVP is configured to be positioned above, on or to the side of roads (such as on or over sidewalks etc.) or other transportation networks (such as railroad tracks etc.). In some embodiments, the PVC can be positioned on the road, and to be driven on by vehicles.

b. At least one Electricity Storage and Transport Unit ESTU, configured for storing and/or conveying electricity generated by at least one PVU. In some embodiments, the ESTU is interconnected to a plurality of PVUs.

In some embodiments, the electricity is transferred using the power grid built in to the road network (such as those used for lighting, traffic lights etc.).

In some embodiments, the storage could be by using high efficiency (rechargeable) batteries for the electricity supply, mainly as a short-term solution (such as daring short periods of darkness, or at night).

In some embodiments, the ESTU has an Electricity Conversion Unit ECU, (often referred to as a solar inverter or PV inverter) configured for converting the direct current (DC) produced by a photovoltaic solar panel, into Alternating Current (AC) that can introduced into any commercial electrical grid.

In some embodiments, the ESTU is configured to store AC and/or DC.

In some embodiments, High Powering moving Electric Vehicles EV can be powered directly by touch or by electromagnetic induction. The powering of EVs can be conducted at specified positions along the road network, such as charging stations or at residential or commercial areas. EV powering can be conducted using convention power points or using non-contact charging (such as induction). In some embodiments, non-contact powering can be conducted on the road, during driving.

As a result, the vast majority of electricity consumption (~90%) would be supplied directly through the road system in a decentralized manner increasing efficiency.

c. At least one Hydrogen Production Unit HPU, (also referred to as Power-to-Gas P2G) using the electric power produced by the PVU to produce hydrogen, which can be used as a fuel. Hydrogen can be used locally or transported to other places.

Hydrogen can be produced with the suitable apparatuses (such as electrolysis and/or water-splitting) and would be stored for further use or transportation.

d. At least one Hydrogen Storage and/or Transporting Unit HSTU, configured for storing and/or transporting hydrogen. In some embodiments, the hydrogen can be stored at a relatively low pressure, for efficiency purposes. Hydrogen is often produced at 50 atm, and can be stored at the pressure of production. The system for transporting the hydrogen for further storage and/or delivery to clients for local use. The pipe network enables both the storage and delivery of the hydrogen produced. The hydrogen stored in the pipes can be used locally or at additional remote sites.

The use of a (low-pressure pipe) for the storage of the hydrogen gas has a number of advantages:

Saving the energy necessary for the generation of the high pressure (energy needed to activate the pressure systems)

Lower pressure containers are safer.

Lowering the pressure can also lower the leak rate.

In some embodiments, the hydrogen can be delivered to long-term storage sites, using physical methods (such as compression or liquidation) or chemical technologies (such as conversion to methane, ammonia etc.). In some embodiments, the HSTU is interconnected to a plurality of HPUs.

In some embodiments, the system may comprise additional units:

e. At least one Hydrogen Conversion Unit HCU (such as a 'fuel cell'), configured for converting hydrogen into electricity. In some embodiments, the electricity that is produced by the HCU is transferred by the ESTU. In some embodiments, HCU is connected to a network of pipes, interconnected to a plurality of HPU and/or HSTUs.

f. Additional power generating units, such as wind or hydro-based.

In some embodiments of the present invention system comprises at least four of the system components from the group of: a Photovoltaic Unit PVU for converting solar energy to electrical energy; a Hydrogen Production Unit HPU for converting said electrical energy to hydrogen by water hydrolysis; a pipe for absorbing, storing, transporting and supplying; a Hydrogen Conversion Unit HCU for producing electricity from said hydrogen; an electrical grid for transmitting said electricity from PVU and produced by the HCU; an Electricity Storage and Transport Unit ESTU for storing and/or transporting said electrical energy; an Electricity Conversion Unit ECU for converting DC electricity from PVU and produced by the HCU to AC electricity.

Figure 2:
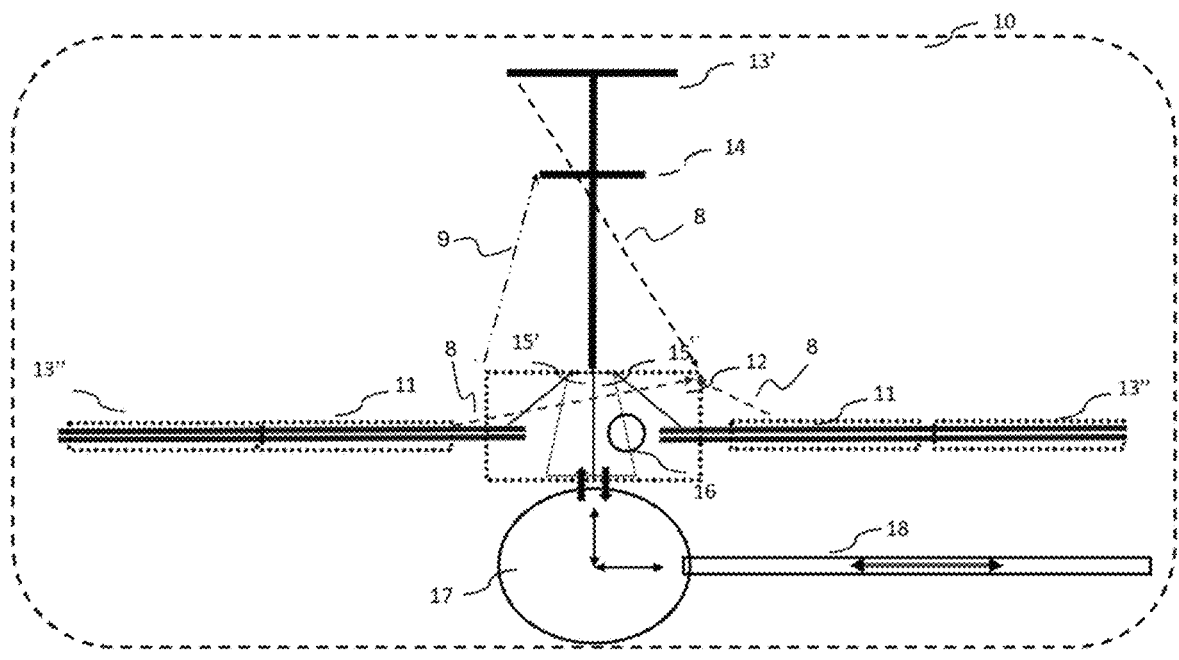
FIG. 2 is a schematic description of the WOL platform, using hydrogen generation technologies on an AC-based electrical grid.

Reference is made to FIG. 2, presenting a non-exclusive, non-limiting embodiment of the present invention, showing a schematic cross-section of an AC road system-based system 10, including two driving lanes 11, and a traffic island 12 positioned between the driving lanes. The PVC can be positioned above the center of the road system 13' or adjacent to the road network 13". In some embodiments, the PVC is configured to be positioned on the road 11. The existing electric grid 14 can be utilized to transfer the electrical current generated by the PVC (9) to an additional position for use by consumers or storage by an ESTU, utilizing convertors (DC to AC, not shown, but in this example placed on traffic island). The hydrogen production unit HPU 15 is positioned close to the PVC (13' and/or 13"), feeding the HPU using DC (8), directly from the PVC (13' and/or 13"). A pipe 16 is positioned to deliver water to the HPU. The hydrogen produced by the electrolysis process is delivered to a pipe 17 positioned along the road network, at a relatively low pressure (Up to 100 Atm.). The pipe 17 acts as a short-term storage system (from day to night) and is used to transfer it according to needs, or to long term storage systems 18. Movement of hydrogen within the system is presented by a line. During periods when the PCV is unable to generate electricity (due to darkness etc.), hydrogen positioned in the pipe 17 or the long-term storage systems 18, can be used to produce electricity using fuel cell technologies 15' and supplying it to the grid using the same infrastructure of invertors. In some embodiments, the electrolysis facilities can also be used as fuel cells, to convert hydrogen to electrical current.

According to the example system presented in FIG. 2, daytime generation of green hydrogen would be conducted at an efficiently in the range of 63-86%

$$\eta_{el} \cong 90\% * 70\% \cong 63\%$$

Or $$\eta_{el} \cong 90\% * 95\% \cong 86\%$$

As calculated as % of the energy generated by the PVC, with 5-to-30% lost during hydrogen generation conversion and 10% lost, as leaks, during hydrogen delivery and/or storage. Using lower pressure pipes will lower the leak rate.

According to the system of FIG. 2, daytime generation of green AC electricity would be conducted at an efficiently of:

$$\eta_{el} \cong 90\% * 95\% \cong 86\%$$

Approximately 10% can be lost to DC-to-AC conversion and up to 5% lost to delivery (2% is lost at short distances, with up to 5% lost at long distances).

According to the system of FIG. 2, nighttime generation of electrical current AC would be conducted at an efficiently in the range of 42-57%

$$\eta \cong 90\% * 70\% * 75\% * 90\% * 98\% \cong 42\%$$

Or $$\eta \cong 90\% * 95\% * 75\% * 90\% * 98\% \cong 57\%$$

As calculated as % of the energy generated by the PVC, with 5-to-30% lost during hydrogen generation conversion and 10% lost, as leaks, during hydrogen delivery and/or storage, approximately 25% lost during generation of electrical current by a fuel cell, 10% lost from conversion of DC to AC, and up to 5% lost to delivery (2% is lost at short distances, with up to 5% lost at long distances). This is based on an estimate hydrogen generation of 70-to-95% and fuel cell rate of 75%.

Figure 3:
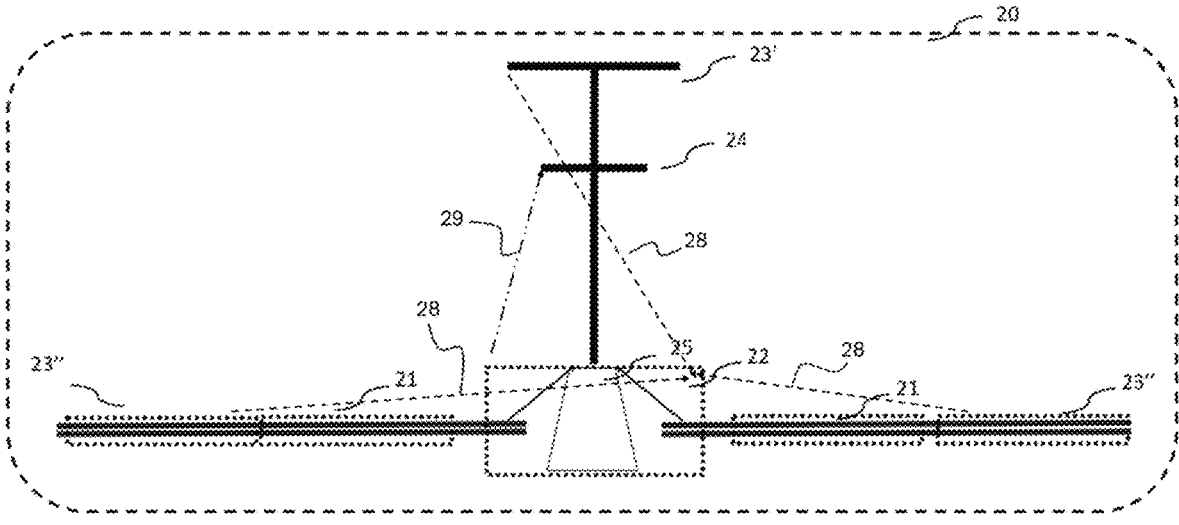
FIG. 3 is a schematic description of the WOL platform, using electric energy storage technologies, on an AC-based electrical grid.

Reference is made to FIG. 3, presenting a non-exclusive embodiment of the present invention, showing a schematic cross-section of an AC road system-based system 20, including two driving lanes 21, and a traffic island 22 positioned between the driving lanes. The PVC can be positioned above the center of the road system 23' or adjacent to the road network 23". In some embodiments, the PVC is configured to be positioned on the road 21. The existing electric grid 24 can be utilized to transfer the electrical current generated by the PVC to an additional position for use by consumers or storage by an ESTU 25, utilizing invertors (DC to AC). The DC generated by the PVC is represented by 28, and the DC inverted to AC is represented by 29. A person skilled in the art would appreciate that when no electrical energy can be generated or taken from storage, electricity can pass through the system from the electrical grid.

According to the example system presented in FIG. 3, (daytime generation) of green AC would be conducted at an efficiently of: 88%

$$\eta \cong 90\% * 98\% \cong 88\%,$$

According to the system of FIG. 3, nighttime generation of green AC would be conducted at an efficiently of: 78%

$$\eta \cong 98\% * 90\% * 90\% \ 98\% \cong 78\%$$

As calculated as % of the energy generated by the PVC, with 10% lost from conversion of DC to AC, 2% lost during batter charging, up to 10% lost during storage, and up to 5% lost to delivery (2% for short distances, with up to 5% lost at long distances)

Figure 4:
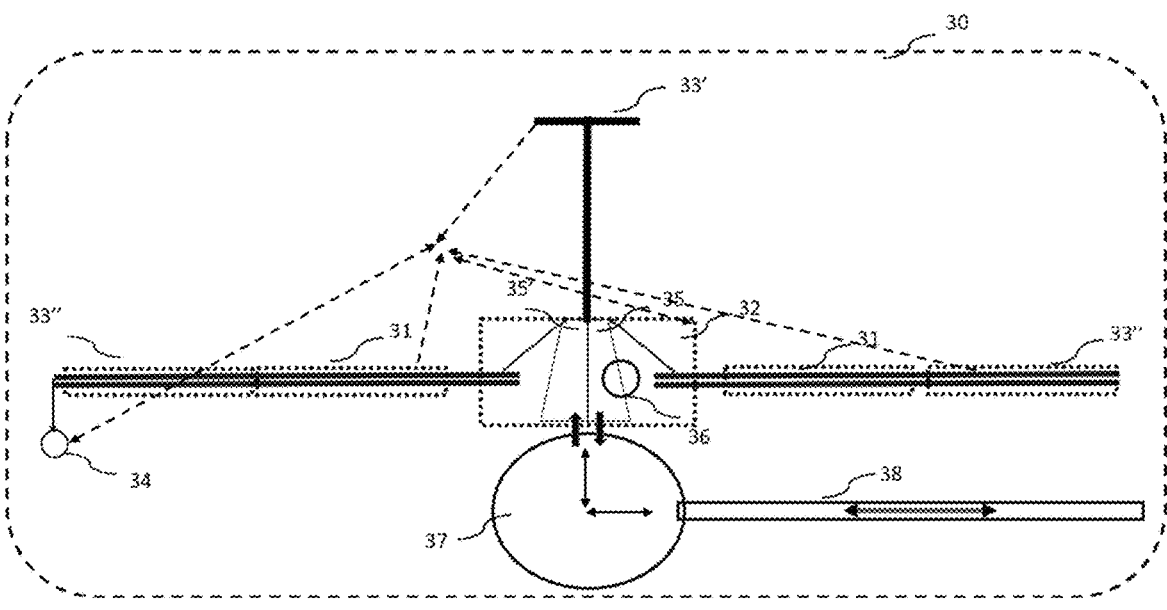
FIG. 4 is a schematic description of the WOL platform, using a DC-based electrical grid.

Reference is made to FIG. 4, presenting a non-exclusive embodiment of the present invention, showing a schematic cross-section of a DC-based road system-based system 30, including two driving lanes 31, and a traffic island 32 positioned between the driving lanes. The PVC can be positioned above the center of the road system 33' or adjacent to the road network 33". In some embodiments, the PVC is configured to be positioned on the road 31. An DC electric grid 34 is positioned adjacent to the road network be utilized to transfer the electrical current generated by the PVC to an additional position for use by consumers or storage by an ESTU. The hydrogen production unit HPU 35 is positioned close to the PVC, feeding the HPU using DC, directly from the PVC. A pipe 36 is positioned to deliver water to the HPU. The hydrogen produced by the electrolysis process is delivered to a pipe 37 positioned along the road network, at a relatively low pressure (up to 100 Atm.). The pipe 37 acts as a short-term storage system (from day to night) and is used to transfer it according to needs, or to long term storage systems 38. During periods when the PCV is unable to generate electricity (due to darkness etc.), hydrogen positioned in the pipe 37 or the long-term storage systems 38, can be used to is used to produce DC electrical current using fuel cell technologies 35' and supplying it to the DC grid (34). In some embodiments, the electrolysis facilities can also be used as fuel cells, to convert hydrogen to electrical current. The movement of DC within the system is represented by a dashed lined ( - - - ).

According to example system presented in FIG. 4, daytime generation of green hydrogen would be conducted at an efficiently at a range of 63-86%

$$\eta_{el} \cong 90\% * 70\% \cong 63\%$$

Or $$\eta_{el} \cong 90\% * 95\% \cong 86\%$$

As calculated as % of the energy generated by the PVC, with 5-to-30% lost during hydrogen generation conversion and 10% lost, as leaks, during hydrogen delivery and/or storage. Using lower pressure pipes will lower the leak rate.

As calculated as % of the energy generated by the PVC, with 5-to-30% lost during hydrogen generation conversion and 10% lost, as leaks, during hydrogen delivery and/or storage. Using lower pressure pipes will lower the leak rate.

According to the system of FIG. 4, daytime generation of green DC electricity would be conducted at an efficiently of:

$$\eta_{el} \cong 95 - 98\%$$

With up to 5% lost to delivery (2% is lost at short distances, with up to 5% lost at long distances).

According to the system of FIG. 4, nighttime generation of electrical current DC would be conducted at an efficiently at a range of 46-63%.

$$\eta \cong 90\% * 70\% * 75\% * 98\% \cong 46\%$$

Or $$\eta \cong 90\% * 95\% * 75\% * 98\% \cong 63\%$$

As calculated as % of the energy generated by the PVC, with 5-to-30% lost during hydrogen generation conversion and 10% lost, as leaks, during hydrogen delivery and/or storage, approximately 25% lost during generation of electrical current by a fuel cell, and up to 5% lost to delivery (2% is lost at short distances, with up to 5% lost at long distances). This is based on an estimate hydrogen generation of 70-to-95% and fuel cell rate of 75%.

As calculated as % of the energy generated by the PVC, with 5-to-30% lost during hydrogen generation conversion and 10% lost, as leaks, during hydrogen delivery and/or storage, approximately 25% lost during generation of electrical current by a fuel cell, 10% lost from conversion of DC to AC, and up to 5% lost to delivery (2% is lost at short distances, with up to 5% lost at long distances). This is based on an estimate hydrogen generation of 70-to-95% and fuel cell rate of 75%.

Figure 5:
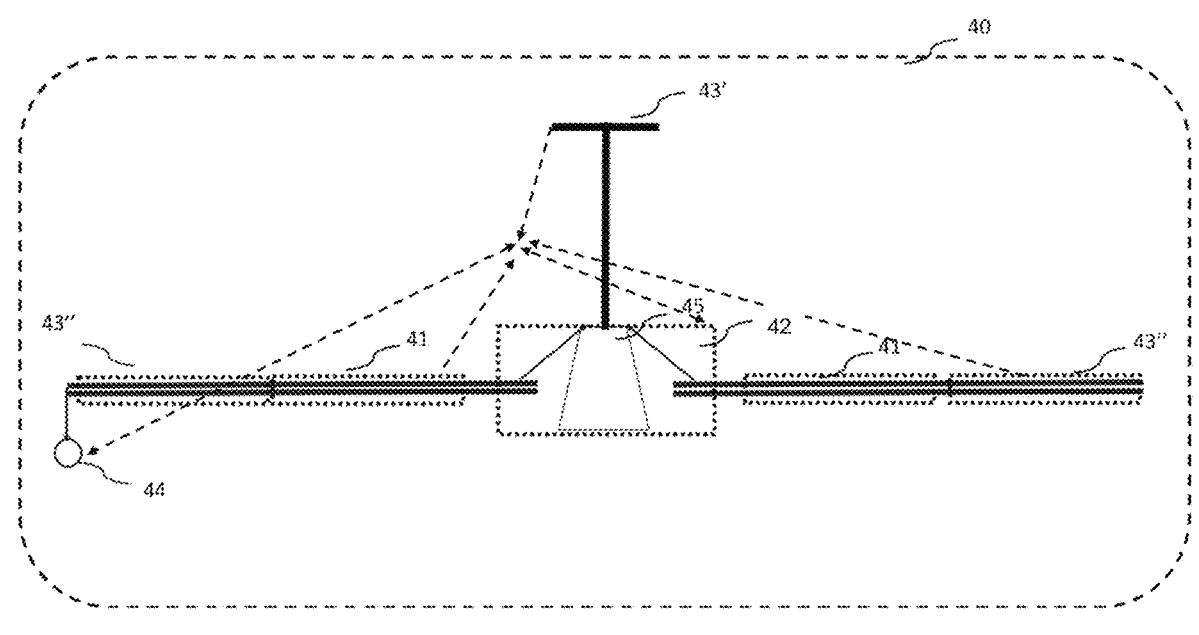
FIG. 5 is a schematic description of the WOL platform, using electric energy storage technologies, on a DC-based electrical grid.

Reference is made to FIG. 5, presenting a non-exclusive embodiment of the present invention, showing a schematic of a cross-section of a DC-based road system-based system 40, including two driving lanes 41, and a traffic island 42 positioned between the driving lanes. The PVC can be positioned above the center of the road system 43' or adjacent to the road network 43". In some embodiments, the PVC is configured to be positioned on the road 41. An DC electric grid 44 is positioned adjacent to the road network be utilized to transfer the electrical current generated by the PVC to an additional position for use by consumers or storage by an ESTU 45. The movement of DC within the system is represented by a dashed lined ( - - - ).

According to the example system presented in FIG. 5, daytime generation of green DC would be conducted at an efficiently of: 98%

As calculated as % of the energy generated by the PVC, with 2% is lost during current delivery.

According to the system of FIG. 4, nighttime generation of green DC would be conducted at an efficiently of: 88%

$$\eta \cong 90\% * 98\% \cong 88\%$$

As calculated as % of the energy generated by the PVC, with 10% lost during battery storage and 2% is lost during current delivery.

The invention claimed is:

1. A system for producing energy on transportation routes, said system comprising:
   at least one Photovoltaic Unit (PVU), comprising at least one photo-voltaic panel for converting solar energy to electrical energy;
   at least one Hydrogen Production Unit (HPU), comprising an electrolyzer for converting said electrical energy to hydrogen by water hydrolysis;
   at least one pipe for at least one of: storing, transporting, supplying hydrogen, and any combination thereof produced by said HPU;
   at least one Hydrogen Conversion Unit (HCU), comprising at least one fuel cell for producing electricity from said hydrogen;
   an AC electric grid connected to for transmitting said electricity generated by said at least one PVU and produced by the HCU;
   a DC grid interconnecting the PVU, HCU and electricity conversion unit (ECU);
   at least one ECU, comprising at least one bidirectional invertor for converting DC electricity input from said PVU and produced by the HCU and outputting AC power to the AC grid, and for converting AC power input from the AC grid to DC power output to the DC grid
   wherein said system is positioned above, adjacent to or on a transportation network.

2. The system of claim 1, wherein said system comprises at least one Electricity Storage and Transport Unit (ESTU) for storing said electricity produced by said PVU and said HCU.

3. The system of claim 1, wherein said solar energy system is characterized as a Photovoltaic Unit PVU.

4. The system of claim 1, wherein said transportation network is physically integrated with a pipe configured to store hydrogen throughout the day; said pipe runs along or beneath said transportation network.

5. The system of claim 1, wherein said transportation network is physically integrated with a pipe configured to transfer hydrogen to a long-term storage system; said long-term storage system that use physical or chemical methods for hydrogen storage.

6. The system of claim 2, wherein said ESTU is a rechargeable battery for storing electrical energy.

7. The system of claim 1, wherein said system is an existing electrical AC grid.

8. The system of claim 1, wherein said system is interconnected to a plurality of PVUs.

9. The system of claim 1, wherein said ECU converts either Direct current DC to Alternating current AC or Alternating current AC to Direct current DC.

10. The system of claim 1, wherein said HCU is configured to store and transport said hydrogen, said unit for storing gas fuel is characterized as a pipe, a tank, as being interconnected to a plurality of HPUs or as being open-ended.

11. The system of claim 10, wherein said gas fuel is selected from a group consisting of ammonia, methane, e-fuels or any other hydrogen carriers.

12. The system of claim 8, wherein said at least one pipe is positioned below, above or adjacent to said transportation network.

13. The system of claim 8, wherein hydrogen storage and transportation is at a pressure of up to 100 atm.

14. A method for producing energy on transportation routes, comprising steps of:

obtaining the system of claim 1;

positioning said at least one PVU above or adjacent to a transportation route;

generating electrical current from said at least one PVU;

transferring said electrical current to said HPU or at least one Electricity Storage and Transport Unit (ESTU);

generating hydrogen by said HPU; and, transferring and/or storing said hydrogen by said HPU;

wherein said step of transferring said hydrogen comprises a step of feeding said hydrogen to a pipe, said pipe interconnected to a plurality of HPU.

15. The method of claim 10, additionally comprising a step of converting said electrical current either from DC to AC or from AC to DC.

16. The method of claim 10, additionally comprising a step of generating an electrical current from hydrogen.

17. A method for producing electricity on transportation routes, comprising steps of:

obtaining the system of claim 13;

positioning said at least one PVU above or adjacent to a transportation route;

positioning said at least one PVC above a road system, adjacent to the road network, or on the road;

generating DC electrical current from said at least one PVU and said at least one PVC;

transferring said electrical current to said HPU or at least one Electricity Storage and Transport Unit ESTU;

generation of hydrogen by said HPU; and, transferring and/or storing said hydrogen by said HPU;

generating an electrical current from said hydrogen by at least one fuel cell;

converting said electrical current from DC to AC; and, transferring said electrical current generated by said PVC, by an electric grid;

wherein said step of transferring said hydrogen comprises feeding said hydrogen to a pipe, said pine interconnected to a plurality of HPU.

* * * * *